United States Patent

Guy et al.

[11] Patent Number: 6,028,037
[45] Date of Patent: Feb. 22, 2000

[54] POLYPROPYLENE COMPATIBLE FILLING PRODUCT FOR OPTICAL FIBER CABLES

[75] Inventors: Francois Guy, Saix; Michel Barbarin, Enghien les Bains; Jean-Claude Payan, Vaucresson, all of France

[73] Assignee: Societe d'Exploitation de Produits Pour les Industries Chimiques SEPPIC, Paris Cedex, France

[21] Appl. No.: 09/203,740

[22] Filed: Dec. 2, 1998

[51] Int. Cl.$^7$ .................................................. C10M 129/00
[52] U.S. Cl. ........................... 508/161; 508/580; 508/581
[58] Field of Search .................................... 508/161, 580, 508/581

[56] References Cited

U.S. PATENT DOCUMENTS

| 3,833,526 | 9/1974 | Cear et al. | 260/2.5 AP |
| 3,960,983 | 6/1976 | Blank | 260/839 |
| 4,839,970 | 6/1989 | Goetze et al. | 350/96.23 |
| 5,433,872 | 7/1995 | Brauer et al. | 252/28 |

FOREIGN PATENT DOCUMENTS

WO 90/10662  9/1990  WIPO .

OTHER PUBLICATIONS

Imai et al., "Treating bisphenol alkylene oxide adducts", *Chemical Abstracts*, vol. 89, No. 4, Jul. 1978.

*Primary Examiner*—Jacqueline V. Howard
*Assistant Examiner*—Cephia D. Toomer
*Attorney, Agent, or Firm*—Young & Thompson

[57] ABSTRACT

A composition useful as a filler for optical fiber cables comprises: a) from 75% to 95% and preferably from 85% to 95% by weight of a compound having a molecular weight of less than 3000 and the formula (I)

$$R_1-[O-CH(R_2)-CH(R_3)]_n-O-Ar_1-C(R_4)(R_5)-Ar_2-O-[CH(R_6)-CH(R_7)-O]_m-R_8 \quad (I)$$

in which $R_1$ and $R_8$ are identical or different and independently of one another represent a hydrogen atom, an alkyl radical of 1 to 6 carbon atoms or a benzyl radical, $R_2$, $R_3$, $R_6$ and $R_7$ are identical or different and independently of one another represent a hydrogen atom, a methyl radical or an ethyl radical, with the proviso that at least one of the radicals $R_2$ and $R_3$ and at least one of the radicals $R_6$ and $R_7$ represent a hydrogen atom, $R_4$ and $R_5$ are identical or different and independently of one another represent a hydrogen atom or an alkyl radical of 1 to 4 carbon atoms, the numbers n and m being other than zero and the sum n+m being less than or equal to 50 and greater than or equal to 2, $Ar_1$ and $Ar_2$ are identical or different and independently of one another represent a divalent arylene radical of 6 to 10 carbon atoms, b) from 5% to 25% and preferably from 5% to 10% by weight of a thixotropic agent, and c) from 0.1% to 1% and preferably from 0.1% to 0.5% by weight of an antioxidant.

8 Claims, No Drawings

POLYPROPYLENE COMPATIBLE FILLING PRODUCT FOR OPTICAL FIBER CABLES

FIELD OF THE INVENTION

The invention relates to optical fiber cable filling products.

1. Background of the Invention

In such cables the free space between the optical waveguides, which are protected by a coating, and the outer jacket of said optical cable is generally filled with a so-called filling compound which has thixotropic properties. This filling compound must be resistant to aging, must be compatible both with the materials constituting the jacket of the optical waveguides and with those constituting the jacket of said optical fiber cable, must be hydrophobic, and is required to possess physical properties which are homogeneous over a wide temperature range so as to avoid subjecting the optical fibers to mechanical stresses.

2. Description of the Prior Art

Filling products for optical fiber cables are generally greases which are obtained by gelling synthetic mineral oils, such as polyalphaolefins or silicones, with inorganic fillers, such as pyrogenic (fumed) silicas or thermoplastic elastomers such as the block polymers SEP or SEBS.

Examples of filling products which are cited in the prior art are the polypropylene glycol/pyrogenic silica mixtures as described in U.S. Pat. No. 4,839,970, the mixtures of a polyol having a molecular weight of more than 3000 with pyrogenic silica, as described in U.S. Pat. No. 5,348,669, or else the mixtures of a polyol with a molecular weight of more than 4000/pyrogenic silica as described in the U.S. Pat. No. 5,433,872. These filling compounds are compatible with polybutylene terephthalate (PBT), which until recently was the principal material in the jackets of optical fiber cables. However, cable manufacturers may be inclined to replace PBT by polypropylene (PP); however, certain types of filling greases, and especially those formulated with polyalphaolefins, are incompatible with the new tubes made of PP. Other types of greases, while being compatible with PP, have a thermal stability which remains low.

SUMMARY OF THE INVENTION

The applicant has therefore sought to develop filling products which do not have the disadvantages set out above but which retain the other properties indispensable for their use in the production of optical fiber cables.

The present invention provides a composition comprising:

a) from 75% to 95% and preferably from 85% to 95% by weight of a compound having a molecular weight of less than 3000 and the formula (I)

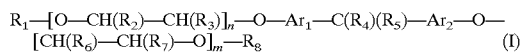

in which $R_1$ and $R_9$ are identical or different and independently of one another represent a hydrogen atom, an alkyl radical of 1 to 6 carbon atoms or a benzyl radical, $R_2$, $R_3$, $R_6$ and $R_7$ are identical or different and independently of one another represent a hydrogen atom, a methyl radical or an ethyl radical, with the proviso that at least one of the radicals $R_2$ and $R_3$ and at least one of the radicals $R_6$ and $R_7$ represent a hydrogen atom, $R_4$ and $R_5$ are identical or different and independently of one another represent a hydrogen atom or an alkyl radical of 1 to 4 carbon atoms, n and m representing numbers other than zero and the sum n+m being less than or equal to 50 and greater than or equal to 2, $Ar_1$ and $Ar_2$ are identical or different and independently of one another represent a divalent arylene radical of 6 to 10 carbon atoms, b) from 5% to 25% and preferably from 5% to 10% by weight of a thixotropic agent, and c) from 0.1% to 1% and preferably from 0.1% to 0.5% by weight of an antioxidant.

DESCRIPTION OF THE PREFERRED EMBODIMENTS

By arylene radical is meant in particular the divalent radicals phenylene, naphthylene and tetrahydronaphthylene and, more particularly, the radicals ortho-phenylene, meta-phenylene and para-phenylene.

As the thixotropic agent, mention may be made in particular of pyrogenic silicas, precipitated silicas or metal soaps; in a first preferred embodiment of the present invention, the thixotropic agent is a pyrogenic silica.

By pyrogenic silicas are meant hydrophobic or hydrophilic, colloidal silicas. In a second preferred embodiment of the present invention, the pyrogenic silica is a hydrophobic silica and, in particular, a silica which has undergone surface treatment with polydimethylsiloxane and has a BET specific surface area of between 50 and 150 $m^2/g$, such as, for example, Cab-O-Sil TS7200® or Aerosil R202®.

As the antioxidant, mention may be made in particular of compounds having a sterically hindered phenol structure, such as, for example, polymeric 2,2,4-trimethyl-1,2-dihydroquinoline, phenothiazine, octyl (3,5-di-tert-butyl-4-hydroxyphenyl)propionate or hydroquinone monomethyl ether, triethylene glycol bis[3-(3'-tert-butyl-4'-hydroxy-5'-methylphenyl)propionate], which is marketed under the brand name IRGANOX® 245, or ethylenebis(oxyethylene) bis(3-tert-butyl-4-hydroxy-5-methylhydrocinnamate), IRGANOX®1076 or IRGANOX®1010.

In a fourth preferred embodiment of the present invention the compound of formula (I) has a molecular weight of less than 2000.

Within a single compound of formula (I), the divalent radicals $—[O—CH(R_2)—CH(R_3)]_n—$ and $—[CH(R_6)—CH(R_7)—O]_m—$ can independently of one another represent a chain of radicals $—(O—CH_2—CH_2)—$, $—[O—CH_2—CH(CH_3)]—$, $—(O—CH(CH_3)—CH_2]—$, $—[O—CH_2—CH(CH_2—CH_3)]—$ or $—[O—CH—CH_2—CH_3)—CH_2]—$, alone or as a mixture; when in the form of a mixture, these radicals are distributed within said chains in a sequenced or random fashion.

The invention particularly provides the composition as defined above for which in formula (I)

one of the radicals $R_2$ and $R_3$ represents a methyl radical and the other a hydrogen atom, one of the radicals $R_6$ and $R_7$ represents a methyl radical and the other a hydrogen atom, $R_1$ and $R_8$ each represent a hydrogen atom, $R_4$ and $R_5$ each represent a methyl radical, $Ar_1$ and $Ar_2$ each represent a phenylene radical, and the sum n+m is less than 20.

The invention more particularly provides a composition as defined above in which the compound of formula (I) is propoxylated bisphenol A having an OP index of less than or equal to 16 and a molecular weight of less than 1500.

The compound of formula (I) is prepared by alkoxylating the compound of formula (II)

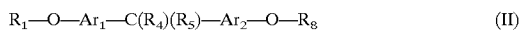

with the epoxides corresponding to the chains —[O—CH($R_2$)—CH($R_3$)]$_n$— and —[CH($R_8$)—CH($R_7$)—O]— which it is desired to form, by a method which is known to the person skilled in the art.

The compounds of formula (II), such as, for example, bisphenol A or 4,4'-(1-methylethylidene)-bisphenol, are compounds which are known to the person skilled in the art and are available commercially; they can also be prepared from commercially available products by methods which are known to the person skilled in the art.

Owing to its physical properties, the composition according to the invention is used as a lubricant.

It is particularly suitable for use as a filling product for optical fiber cables.

The examples which follow illustrate the invention without, however, limiting it.

The following compositions were prepared by mixing from 85 to 95 parts of propoxylated bisphenol A, from 5 to 15 parts of hydrophobic pyrogenic silica (Cab-O-Sil® TS720 or Aerosil® R202) and approximately 0.3% of a phenolic antioxidant (IRGANOX®1076 or IRGANOX®1010).

| Composition | Compound of formula (I) PO index (n + m) | Thixotropic agent |
|---|---|---|
| 1 | 7 | Cab-O-Sil TS720 |
| 2 | 12 | Cab-O-Sil TS720 |
| 3 | 12 | Aerosil R202 |
| 4 | 16 | Cab-O-Sil TS720 | a) the compatibility of compositions 1 to 4 was checked by immersing a polypropylene sheet into a sample of each of them at 85° C. for up to 10 weeks.

No degradation, loss of mass or mass increase of the sheets was observed.

b) the stability of compositions 1 to 4 according to the invention was demonstrated by monitoring the exudation/volatility at 150° C. for 24 hours.

An exudation rate of from 2.0 to 3.5% and a volatility level of from 2% to 3% were found; the compositions which are the subject of the present invention are therefore heat stable.

c) the compatibility of compositions 1 to 4 with optical fiber coatings was evaluated by determining the force required to strip the coating after several weeks of contact (from 20 to 90 days) at temperatures of between 10° C. and 60° C.

Composition 4 exhibits good compatibility with these coatings.

What is claimed is:

1. A composition comprising:

a) from 75% to 95% by weight of a compound having a molecular weight of less than 3000 and the formula (I)

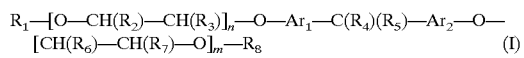

in which $R_2$ and $R_8$ are identical or different and represent a hydrogen atom, an alkyl radical of 1 to 6 carbon atoms or a benzyl radical, $R_2$, $R_3$, $R_6$ and $R_7$ are identical or different and represent a hydrogen atom, a methyl radical or an ethyl radical, with the proviso that at least one of the radicals $R_2$ and $R_3$ and at least one of the radicals $R_6$ and $R_7$ represent a hydrogen atom, $R_4$ and $R_5$ are identical or different and represent a hydrogen atom or an alkyl radical of 1 to 4 carbon atoms, n and m representing numbers other than zero and the sum n+m being less than or equal to 50 and greater than or equal to 2, $Ar_1$ and $Ar_2$ are identical or different and represent a divalent arylene radical of 6 to 10 carbon atoms, b) from 5% to 25% by weight of a thixotropic agent, and c) from 0.1% to 1% by weight of an antioxidant.

2. The composition according to claim 1, wherein the thixotropic agent is a pyrogenic silica.

3. The composition according to claim 2, wherein the pyrogenic silica is a hydrophobic silica which has undergone surface treatment with polydimethylsiloxane and has a BET specific surface area between 50 and 150 m$^2$/g.

4. The composition according to claim 1, wherein the antioxidant is a sterically hindered phenol compound.

5. The composition according to claim 1, wherein the compound of formula (I) has a molecular weight of less than 2000.

6. The composition according to claim 1, for which in formula (I)

one of the radicals $R_2$ and $R_3$ represents a methyl radical and the other a hydrogen atom, one of the radicals $R_6$ and $R_7$ represents a methyl radical and the other a hydrogen atom, $R_1$ and $R_8$ each represent a hydrogen atom, $R_4$ and $R_5$ each represent a methyl radical, $Ar_1$ and $Ar_2$ each represent a phenylene radical, and the sum n+m is less than 20.

7. The composition according to claim 6, wherein the compound of formula (I) is propoxylated bisphenol A having an OP index of less than or equal to 16 and a molecular weight of less than 1500.

8. The composition according to claim 1, comprising from 85% to 95% by weight of a compound of formula (I); from 5% to 10% by weight of the thixotropic agent; and from 0.1% to 0.5% by weight of the antioxidant.

* * * * *